June 21, 1966   F. G. CRIDER ETAL   3,256,952
SEISMIC ENERGY SOURCE
Filed Oct. 12, 1961   2 Sheets-Sheet 1

June 21, 1966 F. G. CRIDER ET AL 3,256,952
SEISMIC ENERGY SOURCE
Filed Oct. 12, 1961 2 Sheets-Sheet 2

4,256,952
SEISMIC ENERGY SOURCE
Fretwell G. Crider, Arlington, and Frank A. Angona, Dallas, Tex., assignors to Socony Mobil Oil Company, Inc., a corporation of New York
Filed Oct. 12, 1961, Ser. No. 144,643
11 Claims. (Cl. 181—.5)

This invention relates to seismic exploration and more particularly to a repetitive seismic source and has for an object the provision of an improved apparatus for generating seismic waves.

In seismic exploration of offshore geologic formations, explosions are initiated to generate seismic or pressure waves which are transmitted through water and penetrate into the geologic formations. The explosions may be initiated by exploding a combustible mixture of gases in a reactor chamber having an open end coupled to the water.

The explosion of the combustible mixture of gases in the reactor chamber creates pressure within the chamber which in turn produces a pressure pulse in the water. This pressure pulse creates a gas pocket, or bubble, which may oscillate by alternately expanding and contracting, thereby creating a subsequent series of pressure pulses. The seismic signal is derived from the pressure wave or series of pressure pulses resulting from the explosion. It is the first pressure pulse that is of importance to a seismogram, and for better penetration and for the production of a seismogram free of extraneous reflections, the first pressure pulse should have an implitude much higher than the subsequent pressure pulses.

To produce a first pressure pulse of high amplitude by exploding a given combustible mixture of gases in a reactor chamber having a given volume and having an open end coupled to the water, all of the gases in the chamber must be burned or exploded at a fast rate. This can be accomplished if all of the gases in the chamber can be ignited instantaneously to create the explosion therein. In order to ignite instantaneously all of the gases within the reactor chamber, the burning surface—the interface between burned and unburned gases—developed within the chamber as the gases are burned or exploded, must develop rapidly to a large value.

Factors, which determine the magnitude of the burning surface developed within the reactor chamber and therefore the rate at which a given gas can be exploded, are the shape and cross-sectional area outlet of the reactor chamber and the manner by which the gases in the chamber are ignited. Also important is the amount of fresh combustible gases within the reactor chamber at the time of the explosion, in comparison with exhaust or burned gases.

Generally in a reactor chamber having an open end coupled to the water, it is difficult to ignite instantaneously all of the combustible gases within the chamber since the combustible gases near the chamber outlet are forced from the chamber before they are burned or exploded. This takes place as the hot product gases expanding behind the burning or ignition surface cause a pressure wave to build up and to progress rapidly through the explosive gas mixture. The pressure wave front travels much faster than the flame front through the unreacted combustible gases. This fast moving compression wave front reaches the open end of the reactor ahead of the flame front and causes the unburned gases to flow from the reactor. Such flow results in a loss of the chemical energy of the unburned gases since such gases flow from the reactor before being ignited by the flame front. Due to the fact that these unburned gases and their chemical energy are lost while the ignition surface is developing, the ignition surface may reach a relatively small value and then slowly decrease as the remainder of the gases are burned. This results in the devolpment of a relatively small reactor chamber pressure which in turn produces a relatively low amplitude first pressure pulse.

In a reactor chamber having an open end coupled to the water, the rate at which a given amount of gases can be exploded can be increased if the chamber is wide or has a large cross section. This is due to the fact that a wide reactor will allow a large ignition surface to be developed therein. The large ignition surface developed therein will result in the gases being burned or exploded in a short period of time and will thereby result in more of the gases being burned or exploded before they are pushed out of the reactor outlet by the pressure created in the reactor. A wide reactor thus has advantages in the production of seismic signals of high amplitude.

In addition, the efficiency of energy transmission depends upon the area of the gas-water contact where transmission takes place and a better energy transfer is obtained if the reactor has a large cross-sectional area outlet.

Even though a wide reactor has advantages, the development of a large ignition surface in such a wide reactor is also dependent upon the manner in which the gases therein are ignited. For example, if combustible gases in a wide reactor are under static conditions and are ignited by a spark plug within the chamber, the ignition surface develops slowly in the form of a sphere and increases to a maximum value determined by the cross-sectional area of the reactor. The rate at which the ignition surface increases under such circumstances is relatively slow, and much of the unburned gases begin to flow out of the end of the reactor before the combustion front reaches the reactor outlet. Thus, the ignition surface developed is relatively small, thereby resulting in the production of a relatively low amplitude first pressure pulse.

In addition to the above factors, it is also important that the reactor chamber be completely filled with fresh combustible gases, to the exclusion of exhaust gases, before it is fired. If the reactor is wide, the filling problem becomes difficult, especially if the reactor is to be fired at short-time intervals.

The fresh combustible gases which are injected into the chamber can be used to sweep out the exhaust gases; however, in a wide reactor chamber, it is difficult to sweep out all of the exhaust gases. For example, if the combustible gases are injected into the chamber by way of a small orifice, the resulting turbulent gas jet enters the wide reactor chamber with a small angle of divergence independent of jet velocity. Such a gas jet cannot reach much of the space in a wide reactor, and this results in inefficiency in sweeping out and replacing the burned product gases with fresh gases. The charge is thus diluted with burned gases at the time of firing.

In accordance with the present invention, an exploding gas reactor having a chamber formed by enclosing wall structure and having an open end with a large cross-sectional area outlet to be coupled to the water is provided for producing a seismic wave having a high amplitude first pressure pulse. Positioned at the end of the chamber opposite the outlet is a flow tube having one end interconnected with the interior of the chamber. A means is provided for injecting combustible gases through the flow tube into the chamber, and a means is also provided for igniting the combustible gases within the flow tube to create high velocity hot gases therein to explode the combustible gases within the chamber. Positioned between the end of the flow tube interconnected with the interior of the chamber and the open end of the chamber and in the flow path of the high velocity hot gases and the combustible gases issuing from the end of the flow tube is a dispersing means. The purpose of the dispersing means is to disperse the high velocity hot gases issuing from the flow tube into the chamber immediately throughout a large volume of the chamber to ignite immediately the combustible gases within the chamber. The dispersing means also disperses the combustible gases throughout the chamber after each explosion to rapidly displace the exhaust gases therefrom to completely fill the chamber with fresh combustible gases.

For further objects and advantages of the invention, and for a more complete understanding thereof, reference may now be had to the following accompanying drawings wherein.

Figure 1:
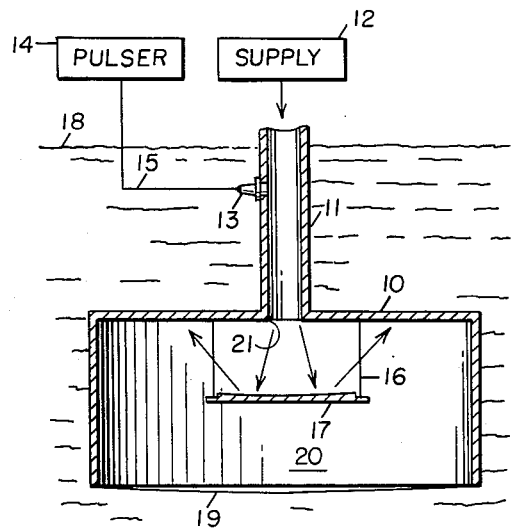
FIG. 1 illustrates an exploding-gas reactor of the present invention.

Referring to FIG. 1 of the drawings, there is disclosed a cross-sectional view of a wide exploding-gas reactor chamber 10 positioned within the water 18 as it may appear immediately prior to the time that the gases within the chamber are exploded. A concave gas-water interface 19 is created at the reactor outlet 20 as a result of the gas pressure within the reactor. Although means for supporting the chamber within the water are not shown, the chamber can be supported within the water by a boat.

Positioned within the chamber is a dispersing means 17 utilized in the production of seismic signals having a first pressure pulse of high amplitude. Combustible gases are injected by a supply source 12 into the chamber through an ignitor tube 11 which is connected at the inlet 21 of the chamber. As the gases are flowing through the tube past a spark plug 13, a pulser 14, by way of conductor 15, actuates the spark plug to ignite the gases in the tube 11. There is then created within the ignitor tube a flame which travels down the tube to ignite the fresh gases in the reactor chamber 10. The velocity of the flame front traveling down the tube 11 is increased over its normal velocity since it is supplemented by the velocity of the combustible gases flowing through the tube 11. The purpose of the ignitor tube arrangement is thus to create high velocity hot gases which ultimately explode the combustible gases within the chamber 10. The high velocity hot gases in the tube 11 then burst out into the enlarged chamber 10 and are deflected and dispersed by the deflecting or dispersing means 17 throughout a large volume of the chamber to ignite immediately the combustible gases in the chamber to explode the gases therein.

After each explosion combustible gases are injected from the supply source 12, through the tube 11 and into the chamber 10. The dispersing means again performs an important function of deflecting or dispersing the fresh gases throughout the chamber to rapidly sweep out the exhaust gases and fill the chamber with fresh gases.

Before discussing in more detail the manner in which the dispering means 17 aids in the production of a high amplitude first pressure pulse, there will be described the pressure wave generated from an exploding-gas reactor having an open end coupled to the water and the relationship between the first pressure pulse, the reactor chamber pressure, and the burning surface developed within the reactor chamber.

Figure 2:
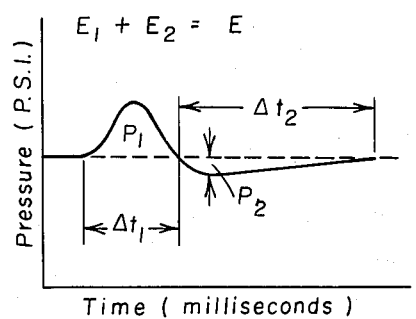
FIG. 2 illustrates the form of a pressure wave generated from an exploding-gas reactor.

FIG. 2 illustrates a pressure wave which may be generated from an exploding-gas reactor having an open end coupled to the water. As the gases in the reactor are exploded, a bubble is formed in the water and a first pressure pulse is created which increases above the hydrostatic pressure of the water to a maximum value at $p_1$. The first pressure pulse $p_1$, which is important to a seismogram, has an amplitude dependent upon the pressure produced within the reactor chamber as the gases are exploded therein. As the bubble expands, the pressure of the gases decreases to a minimum value at $p_2$, which is less than the hydrostatic pressure of the water. The bubble then contracts and other pressure pulses are formed as the bubble subsequently oscillates by expanding and contracting.

The energy E transmitted to the water from the reactor may be estimated from the following equation:

$$E = 0.462(p_1^2 \Delta t_1 + p_2^2 \Delta t_2) \qquad (1)$$

where:

E = energy of the first two pressure pulses,
$p_1$ and $p_2$ = the pressure for the first and second pressure pulses, respectively,
$\Delta t_1$ and $\Delta t_2$ = the times of the duration of $p_1$ and $p_2$, respectively.

Other pressure pulses following the pressure pulse $p_2$ also contribute to the energy E, but their contribution is rather insignificant and is neglected in the estimate of the energy.

The amplitude of the first pressure pulse varies with the magnitude of the pressure produced within the reactor chamber upon the explosion of the gases therein. The magnitude of the reactor chamber pressure in turn varies with the burning surface developed within the chamber as the gases are burned. This latter relationship is illustrated by the following equation:

$$P_c = \frac{[Sb(M/RT)]^{1/n}}{C_d A} \qquad (2)$$

where:

$P_c$ = reactor chamber pressure,
S = burning surface area,
b and n = empirical constants characteristic of the particular gas composition,
M = molecular weight,
R = universal gas constant per mole of gas,
T = combustion temperature within the reactor chamber,
$C_d$ = discharge coefficient of gas flowing from the reactor depending only on gas temperature and heat capacities,
A = cross-sectional area of the open end of the reactor.

For a particular reactor and explosive gas-oxidant mixture all of the terms on the right side of the Equation 2 are constant except S. Therefore, the pressure $P_c$ will change as does the burning surface during the combustion process. Thus, a large burning surface will produce a large reactor chamber pressure which in turn will produce a high amplitude first pressure pulse.

Figure 3:
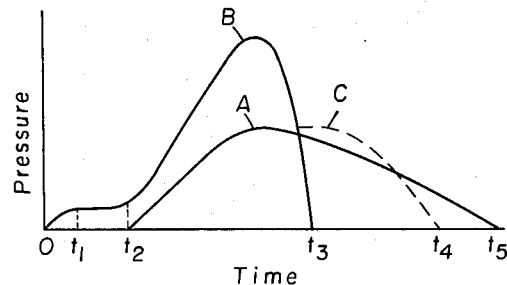
FIG. 3 illustrates the manner in which reactor chamber pressure may vary with time.

Referring now to FIG. 3 of the drawings, there is disclosed the manner in which the pressure throughout the reactor chamber, as derived from burning surface considerations, may vary with time. As the gases within the reactor chamber are ignited and burned, pressure is developed immediately throughout the reactor chamber. The magnitude of the reactor pressure varies with the magnitude of the burning surface, as previously discussed. If the dispersing means and the ignitor tube arrangement of FIG. 1 are not utilized, and if the combustible gases within the reactor chamber 10 are under static conditions and are ignited within the chamber by a point source, the reactor pressure may vary in the manner illustrated by Curve A. As illustrated by Curve A, the pressure throughout the reactor chamber gradually increases to a relatively small value. This is due to the fact that, under the above conditions of ignition, the ignition surface develops rather slowly in a spherical manner until it reaches a maximum value determined by the cross-sectional area of the reactor. The gradual development of the ignition surface and therefore the gradual development of reactor pressure results in much of the unburned gases being pushed out of the reactor outlet before they are burned. This in turn results in the development of a relatively small ignition surface and resultant reactor pressure.

Curve B of FIG. 3 illustrates the manner in which the ignition surface and therefore the pressure in the reactor chamber will be developed if the dispersing means and the ignitor tube arrangement of FIG. 1 are utilized in the wide reactor 10. After the combustible gases flowing through the tube 11 are ignited by the spark plug 13, ignition spreads in an approximate spherical front in the tube 11 until it fills the cross section of the tube 11. Thereafter, a flame front is propagated down the ignitor tube, the flame front serving to ignite a fresh surface of gas as it is contacted. The development of the ignition surface in the tube 11 and therefore the development of pressure in the tube, from the time of initial ignition to the time that the flame front fills the cross-sectional area of tube 11, is represented by the portion of Curve B of FIG. 3, from time period zero to $t_1$. As the flame front is now propagated down the ignitor tube, the ignition surface and hence the pressure remains substantially constant. This constant value is represented by the portion of Curve B from time period $t_1$ to $t_2$.

A second ignition occurs when the hot gases of the flame front suddenly flow into the large reservoir of unburned gases in the reactor 10. The ignition surface proceeds through the reactor in the shape of a frustrum of a cone. Flame propagation proceeds both laterally and downstream; however, it proceeds faster downstream in the reactor than it proceeds laterally since the velocity of the flame front is supplemented downstream by the flow velocity of the gas flowing in the tube 11. Thus, the conical-shaped flame front is elongated in the downstream direction.

The deflecting or dispersing means 17 supported by rods 16 will break up the conical-shaped flame front traveling at an increased rate of speed and spread the hot gases issuing from the ignitor tube throughout a large volume of the chamber. The deflecting means will slow down the flow of gas but not the movement of the flame front. The portion of Curve B of FIG. 3, from time period $t_2$ to $t_3$, represents the manner in which the reactor chamber pressure and therefore the ignition surface is developed in the wide reactor 10 with the use of the ignitor tube and the deflector 17. As illustrated, a very large ignition surface is attained thereby resulting in the gases in the chamber being burned or exploded at a very fast rate. This, in turn, results in the production of a very large reactor chamber pressure and a first pressure pulse in the water having a high amplitude. As the amplitude of the first pressure pulse increases, the frequency of the seismic signal increases; however, the frequencies of the seismic signals from wide reactors lie in a useful seismic range.

Another factor which is important to the efficient utilization of the gases in a reactor is the length of the reactor. For example, if the reactor chamber 10 were relatively long, the ignition surface developed may reach a large value and then decrease to a lesser value for a period of time dependent upon the cross-sectional area and the length of the reactor. For example, the ignition surface may increase to the maximum value illustrated by Curve B. Then, instead of decreasing to a minimum at time $t_3$, the ignition surface may decrease to a minimum at time $t_4$, as illustrated by Curve C. This is due to the fact that the deflecting means 17 is not effective in spreading the hot gases issuing from the tube 11 a great distance downstream from the deflecting means. Further downstream, past the effective distance of the dispersing means, the magnitude of the burning surface will depend upon the cross-sectional area of the reactor. Since the gases, which are burned after the ignition surface reaches its maximum value, do not contribute to the development of the amplitude of the first pressure pulse, these gases are inefficiently utilized. The length of the chamber should therefore be limited to the distance which the dispersing means can effectively spread the hot gases downstream.

The deflector or dispersing means not only contributes to the development of a large seismic signal by deflecting the hot gases immediately over a large volume of the reactor chamber to ignite the fresh gases therein, but it also serves to deflect the fresh gases injected into the chamber throughout the volume of the chamber. This enables the chamber to be more completely filled with fresh gases. This is important if the time interval between each firing is short. In many cases it is desirable to periodically generate seismic waves and to composite the reflected signals to form a single trace on a chart. In marine seismic explorations, if the seismic source is attached to a moving boat, the time interval between each firing must be short, for example, 3 to 10 seconds, in order to properly composite the reflected signals.

Figure 4:
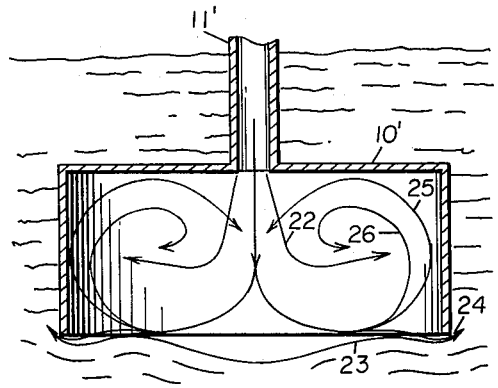
FIG. 4 illustrates the paths which the combustible gases may take after being injected into a wide reactor.

If combustible gases are injected, by way of a small orifice into a wide reactor which has no dispersing means, the gas jet will enter the reactor chamber and diverge at a small angle. This is illustrated by the jet streamline 22 in FIG. 4. If the reactor outlet is coupled to the water, as is the reactor 10′ in FIG. 4, the gases injected will pass directly through the reactor and will then be deflected by the water. Under such conditions, the gas-water interface 23 will not be concave as shown in FIG. 1. This is due to the fact that the direct pressure of the gas, flowing from ignitor tube 11′, will form a dimple directly below the ignitor tube.

At least three flow paths can be established for gas flowing through a reactor having an open end coupled to the water. Some of the gases are deflected radially outward where they flow by path 24 under the reactor walls and are released in bubbles rising to the surface outside of the reactor wall. A strong recirculation pattern 25 may be formed from some of the gases that sweep out the reactor between explosions. A weak recirculation pattern 26 may be formed wherein exhaust gases may be trapped in a low velocity loop. In a reactor having a large diameter, such gases are difficult to flush from the reactor. This results in inefficiency since all of the available explosive mixture volume is not being utilized. The sweep efficiency or normal jet flow through wide cylindrical reactors is shown to be poor—and gets worse as the reactor diameter gets larger. By sweep efficiency is meant the ratio of exhaust gases swept out of the reactor and replaced by fresh unburned explosive gas mixture to the reactor volume. If exhaust gases remain in the reactor, the reactor charge is diluted with the exhaust gases at the time of firing.

After each explosion, the deflecting means serves to deflect the fresh gases injected into the chamber over a large volume of the chamber. When this occurs, more of the burned gases will be swept out and the chamber can be more completely filled with fresh gases in a shorter period of time. In other words, a zone of fully developed flow in the reactor is established in a short period of time and all the available volume can be more completely filled with fresh gases.

Table I below discloses that the reactor 10 with the ignitor tube arrangement and with the deflecting or dispersing means 17 will produce a much greater first pressure pulse in water than will the reactor without the deflector. This is also true of the total energy output as measured in water.

TABLE I

*Output of reactors at firing rate of 6 seconds*

| Cylindrical Reactor | Maximum Pressure ($P_1$) in Water (p.s.i.) | Energy, E, in Joules ($E_1+E_2$) |
| --- | --- | --- |
| Without Deflector | 1.64 | 66 |
| With Deflector | 6.40 | 355 |

The results of Table I were obtained with a cylindrical reactor 13 inches in length and 30 inches in diameter. In both examples of Table I an ignitor tube was used which was two feet long, having an inside diameter of two inches and a spark gap located in the tube one foot from the ends. In the second example of Table I, the deflecting or dispersing means was a dished plate with an outside diameter of twelve inches centrally located seven to eight inches from the ignitor tube inlet. The gas used was a stoichiometric mixture of butane-propane, air, and pure oxygen. The butane-propane gas contained 27.8% butane by volume or 37.7% butane by weight. Although firing rates of only six seconds are disclosed in Table I, the reactors can be fired at other rates.

In the operation of the reactor, the gases are continuously injected into the ignitor tube at a predetermined rate and periodically ignited by the spark plug. When the gases in the tube are ignited by the spark plug, the burning surface in the tube develops in both directions; however, the combustible gases will prevent the flames from coming up the tube if the flow velocity of the fresh gases is greater than the flame velocity. The flow velocity of the gas, however, must not be too high since the gas may blow out the spark and thereby prevent ignition. A flow velocity of 61.5 standard cubic feet per minute for the combustible gases has been found satisfactory for an ignitor tube having an inside diameter of two inches. After each firing the exhaust gases within the reactor chamber create a back pressure which prevents the fresh gases from immediately entering into the chamber. When the exhaust back pressure decreases, the fresh gases begin to flow into the chamber and flush the exhaust gases out into the water.

Figure 5:
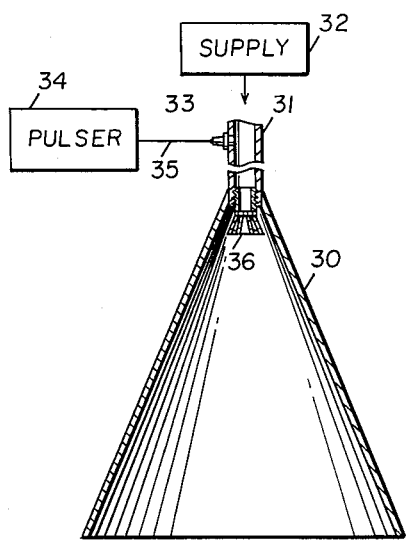
FIG. 5 illustrates another embodiment of an exploding-gas reactor of the present invention.

Reactor 30 of FIG. 5 represents another form of an exploding-gas reactor which can be used to produce large seismic signals. The reactor 30 may have a cone shape or a pyramid shape with a large cross-sectional area outlet. The diverging sides of the reactor 30 allow the ignition surface to continuously increase to a large value, thereby resulting in a large reactor chamber pressure. A cone-shaped or pyramid-shaped reactor generally loses less fresh gas than a cylindrical-shaped reactor of the same volume. This is due to the fact that because of the expanding cross-sectional area of a cone-shaped or pyramid-shaped reactor, the gas flow velocity in such a reactor continually decreases along the vertical axis thereof. At the outlet of such a reactor, the gas flow velocity is less than the gas flow velocity at the outlet of a cylindrical reactor.

In addition, a cone-shaped or pyramid-shaped reactor can be more completely filled with fresh gas in a shorter period of time than a wide cylindrical-shaped reactor. This is due to the fact that the diverging jet stream of the fresh gases more closely follows the inner surface walls of a cone-shaped or pyramid-shaped reactor and therefore more completely sweeps out any exhaust gas in the reactor. Thus, generally, a cone-shaped or pyramid-shaped reactor is productive of a large seismic signal.

It has been found that a cone-shaped or pyramid-shaped reactor can be made to produce an even greater seismic signal if hot gases are injected into the chamber at a high velocity and a dispersing means of a particular type utilized to spread the hot gases throughout a large volume of the chamber.

Figure 6:
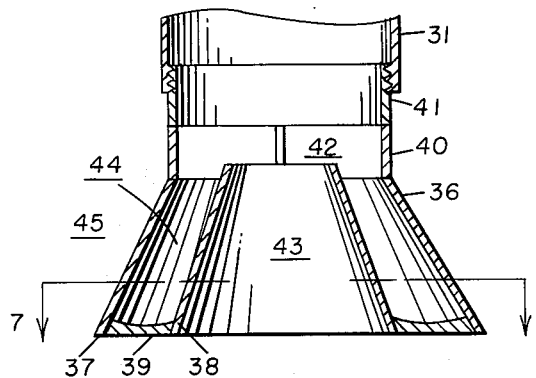
FIG. 6 illustrates an enlarged view of the dispersing means utilized in the exploding-gas reactor of FIG. 5.
Figure 7:
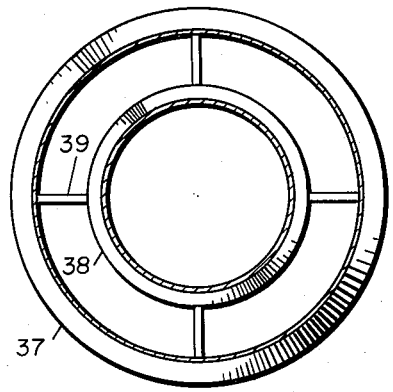
FIG. 7 is a sectional view of the dispersing means of FIG. 6 taken along the lines 7—7 thereof.

A dispersing means which has been found to be effective in a cone-shaped or pyramid-shaped reactor is the diffuser 36, illustrated in FIGS. 5, 6, and 7. The diffuser 36 consists of concentric truncated cones which spread the hot gases throughout the chamber to ignite immediately the fresh gases over the entire volume of the chamber. The hot gases can be injected into the chamber at a high velocity by injecting fresh gases into an ignitor tube 31 from a supply source 32 and igniting the fresh gases flowing in the tube 31. As the combustible gases are flowing in the tube 31, pulser 34, by way of conductor 35, actuates spark plug 33 to ignite the gases within the tube.

A cross section of an enlarged view of the diffuser or dispersing means 36 is shown in FIG. 6. As can be seen therein, the diffuser is made up of two concentric truncated cones 37 and 38, spaced one from the other by four lower spacers 39. The two cones are supported within the chamber by four supports 40, which are in turn attached to a threaded collar 41 so that the whole device can be easily attached to the threaded end of the ignitor tube 31.

In operation, a jet of hot igniting gas flows from the ignitor tube into section 42 where the jet stream begins to diverge. Supports 40 hold the cone off from the jet orifice so that divergence can start before the cones further deflect the ignition stream. Part of the jet stream flows directly through section 43; another part flows through section 44; and a third part of the jet stream is deflected outside of the cone through section 45. The effect of the diffuser is to divide the jet stream into three parts—each part acting as a separate ignition source in the reactor. FIG. 7, which is a sectional view of the diffuser of FIG. 6, taken along the lines 7—7 thereof, shows that the spacers and supports will not impede the flow of gas. With such a diffuser, part of the high velocity gases issuing from the ignitor tube will penetrate deep into the reactor and will ignite the explosive gases far downstream. In the meantime, part of the hot gases will be spread out into other regions of the reactor.

The diffuser 36 also aids in filling the reactor more completely with fresh gases between each firing as does the deflector 17.

Although the diffuser 36 is shown as made up of two concentric truncated cones, more than two cones can be used in certain operations. In addition, the diffuser 36 can also be used in the reactor 10 of FIG. 1; however, the angle of divergence of the outermost truncated cone must be greater in order to deflect the hot gas into the far corners of the wide cylindrical reactor. Thus, it is within the scope of this invention to vary the angle of divergence of the cones, depending upon the shape of the reactor within which they are to be used.

Figure 8:
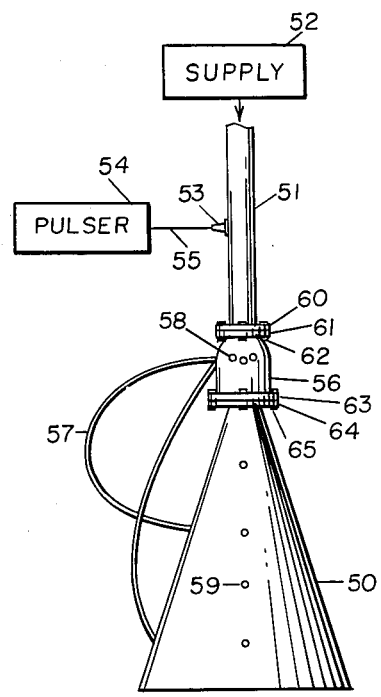
FIG. 8 is another embodiment of an exploding-gas reactor of the present invention.
Figure 9:
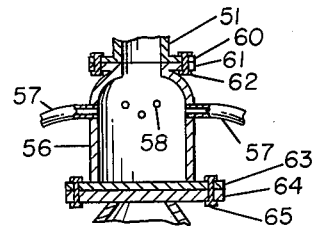
FIG. 9 is an enlarged cross-sectional view of a portion of the exploding-gas reactor of FIG. 8.

Another embodiment of the present invention is shown in FIG. 8 and FIG. 9. In this embodiment, a cone-shaped or pyramid-shaped reactor 50 is utilized and an ignitor tube 51 is interconnected with the interior of the chamber 50 by way of a dispersing means. The dispersing means comprises a dispersing chamber 56 and a plurality of flow channels or tubes 57. The flow channels or tubes 57 are attached within holes 58 in the side walls of the dispersing chamber as can be seen in FIG. 9, which is an enlarged cross-sectional view of the dispersing chamber 56. Tubes 57 are also attached within holes 59 in the side walls of the reactor chamber 50, thereby providing a flow path from the interior of the dispersing chamber 56, through the tubes 57, to the interior of the chamber 50. Combustible gases are injected into the ignitor tube 51 by supply source 52. From the tube 51 the gases flow into dispersing chamber 56 and into the chamber 50 by way of tubes 57. As the gases are flowing in tube 51, pulser 54, by way of conductor 55, actuates spark plug 53 to ignite the gases in the tube.

As can be seen in FIGS. 8 and 9, the dispersing chamber 56 is attached to the ignitor tube by flange connections 60 and 61 and bolts 62 and to the reactor chamber 50 by flange connections 63 and 64 and bolts 65. Flanges 63 and 64 extend completely across the bottom of the dispersing chamber 56 and the top of the reactor chamber 50, thereby blocking the flow of hot gases from the dispersing chamber directly into the chamber 50.

Although only two tubes 57 are shown in the embodiment of FIG. 8, twelve tubes of the same length were used. The tubes are attached to the chamber 50 in such a manner that the hot gases flowing through the tubes 57 and into the chamber 50 are uniformly dispersed throughout the chamber. Since the tubes 57 are all of the same length, a plurality of high velocity flame fronts are uniformly fed through the tubes 57 into the reactor chamber at the same time. With such an arrangement, a very large ignition surface will be developed within the chamber. This will result in the gases being burned or exploded at a very fast rate whereby a large reactor pressure and a first pressure pulse of high amplitude will be produced.

Between each firing, the fresh gases flow through the ignitor tube 51 into the dispersing chamber 56 where they are directed into the reactor chamber by way of tubes 57 to quickly displace the exhaust gases and fill the chamber with fresh gases.

Although the dispersing means, comprising the dispersing chamber 56 and the tubes 57, is shown employed with a cone-shaped or pyramid-shaped reactor in FIG. 8, the dispersing means can also be used with a wide cylindrical-shaped reactor.

Figure 10:
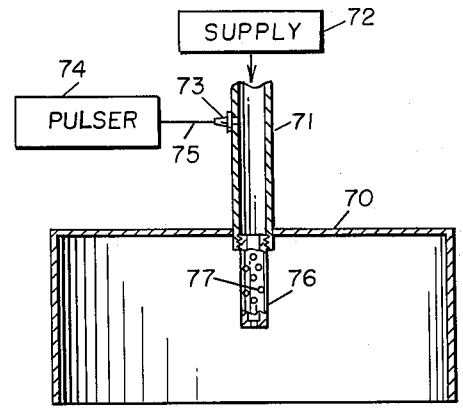
FIG. 10 is still another embodiment of an exploding-gas reactor of the present invention.

FIG. 10 of the drawings discloses another deflecting or dispersing means which can be used in a wide exploding-gas reactor to increase the output thereof. The dispersing means consists of a perforated tube 76 threadedly attached to the ignitor tube 71 and positioned within the reactor chamber 70. Combustible gases are supplied to the ignitor tube 71 from supply source 72. As the gases are flowing in tube 71, pulser 74, by way of conductor 75, actuates spark plug 73 to ignite the gases within the tube. The hot gases flow into the tube 76 and are spread out into the chamber 70 through the holes 77. Between each firing the fresh gases are uniformly injected into the chamber through the holes 77 of the tube 76.

Now that the invention has been described, modifications will become apparent to those skilled in the art and it is intended to cover such modifications as fall within the scope of the appended claims.

What is claimed is:

1. A seismic wave generator for production of seismic signals having a first pressure pulse of high amplitude useful in the investigation of underwater geologic formations, comprising a reactor chamber for confining combustible gases to be exploded in contact with water, said chamber being formed by an enclosing wall structure and having an open end of a large cross-sectional area for coupling the gases to the water, a flow tube having an outlet entering the reactor chamber opposite said open end and having an inlet adapted for connection with a supply of combustible gases, a dispersing means positioned at least in part between said flow tube outlet and said large open end of said reactor chamber, means for injecting combustible gases into said reactor chamber through said flow tube for dispersion by said dispersing means throughout said reactor chamber, and means for igniting the combustible gases at a point within said flow tube displaced from said outlet thereof, the velocity of the resulting flame front traveling toward the outlet of said flow tube being supplemented by the injection velocity of said combustible gases, said dispersing means spreading the high velocity burning gases of the flame front throughout said reactor chamber for immediate ignition of the combustible gases therein, said dispersing means after each burning serving to disperse the combustible gases issuing from said flow tube throughout said chamber to displace rapidly the exhaust gases from said chamber and to fill completely said chamber with combustible gases.

2. The apparatus of claim 1 wherein said dispersing means comprises a deflecting plate positioned within said chamber and spaced from said wall structure.

3. The apparatus of claim 1 wherein the dispersing means comprises hollow truncated cone structure positioned within said chamber and spaced from said wall structure.

4. The apparatus of claim 1 wherein the dispersing means comprises a plurality of flow channels interconnecting the interior of said flow tube with the interior of said reactor chamber.

5. The apparatus of claim 1 wherein the dispersing means comprises a perforated tube interconnected with said one end of said flow tube and extending into said reactor chamber.

6. The apparatus of claim 1 wherein said reactor chamber is in the form of a cylinder.

7. The reactor of claim 1 wherein said reactor chamber is in the form of a cone.

8. A seismic wave generator for production of seismic waves useful in the investigation of underwater geologic formations, comprising a reactor chamber formed by enclosing wall structure and having an open end with a large cross-sectional area outlet to be coupled to water, a dispersing chamber, a flow tube connected to said dispersing chamber, a plurality of flow channels interconnecting the interior of said dispersing chamber and the interior of said reactor chamber whereby a plurality of flow paths are provided from said dispersing chamber to said reactor chamber, means for injecting combustible gases into said flow tube for flow into said reactor chamber through said plurality of flow channels, and means for igniting the combustible gases within said flow tube to create high velocity hot gases therein for flow through said plurality of flow channels to explode the combustible gases within said reactor chamber.

9. The apparatus of claim 8 wherein said reactor chamber is in the form of a cylinder.

10. The apparatus of claim 8 wherein said reactor chamber is in the form of a cone.

11. A means for generating seismic waves having a first pressure pulse of high amplitude for use in investigation of underwater geologic formations, comprising a chamber for confining combustible gases to be exploded in contact with water and having an open end forming an outlet for coupling the gases therein to an external mass of water, at least one flow tube having an end coupled to the interior of said chamber at an otherwise closed end opposite said outlet and provding an initial flow path for filling said chamber with combustible gases, means for injecting combustible gases through said flow tube and into said chamber, means including said flow tube for producing high velocity hot igniting gases for injection into said chamber to ignite the combustible gases in said chamber, and dispersing means located in said chamber between said end of said flow tube and said outlet with at least a portion of said dispersing means being in the flow path of said hot gases issuing from the end of said flow tube for increasing the cross-sectional area of the high velocity hot gases to ignite all the combustible gases within said chamber in a minimum of time for generation of maximum energy.

References Cited by the Examiner

UNITED STATES PATENTS

| | | | |
|---|---|---|---|
| 1,500,243 | 7/1924 | Hammond | 340—12 |
| 2,412,825 | 12/1946 | McCollum | 60—35.6 |
| 3,024,597 | 3/1962 | Beck et al. | 60—35.6 |

FOREIGN PATENTS 386,908   1/1933   Great Britain.

BENJAMIN A. BORCHELT, *Primary Examiner.*

CHESTER L. JUSTUS, SAMUEL FEINBERG,
*Examiners.*

V. J. DIPIETRO, G. H. GLANZMAN,
*Assistant Examiners.*